US012107446B2

(12) United States Patent
Syouda et al.

(10) Patent No.: US 12,107,446 B2
(45) Date of Patent: Oct. 1, 2024

(54) CHARGING CONTROL DEVICE, BATTERY SYSTEM, AND CHARGING CONTROL METHOD

(71) Applicant: YAZAKI CORPORATION, Tokyo (JP)

(72) Inventors: Takahiro Syouda, Susono (JP); Chihiro Ono, Susono (JP)

(73) Assignee: YAZAKI CORPORATION, Tokyo (JP)

(*) Notice: Subject to any disclaimer, the term of this patent is extended or adjusted under 35 U.S.C. 154(b) by 469 days.

(21) Appl. No.: 17/382,362

(22) Filed: Jul. 22, 2021

(65) Prior Publication Data

US 2022/0045524 A1 Feb. 10, 2022

(30) Foreign Application Priority Data

Aug. 4, 2020 (JP) ................................. 2020-132571

(51) Int. Cl.
*H02J 7/00* (2006.01)

(52) U.S. Cl.
CPC .......... *H02J 7/0024* (2013.01); *H02J 7/0016* (2013.01); *H02J 7/0019* (2013.01); *H02J 7/007182* (2020.01)

(58) Field of Classification Search
USPC .......................................................... 320/137
See application file for complete search history.

(56) References Cited

U.S. PATENT DOCUMENTS

| 5,675,233 A * | 10/1997 | Kaneko | ................. | H02J 7/0016 320/145 |
| 5,945,805 A * | 8/1999 | Takei | ................. | H02J 7/00047 320/124 |
| 2013/0302657 A1 | 11/2013 | Itakura | | |
| 2020/0028375 A1 | 1/2020 | Ono et al. | | |

FOREIGN PATENT DOCUMENTS

| JP | 2013-031247 A | | 2/2013 | | |
| JP | 2013090525 A | * | 5/2013 | | |
| JP | 2013-240155 A | | 11/2013 | | |
| JP | 2020-5386 A | | 1/2020 | | |
| JP | 2020-22342 A | | 2/2020 | | |
| WO | WO-2014156041 A1 | * | 10/2014 | .......... | H01M 10/441 |

* cited by examiner

*Primary Examiner* — Samuel Berhanu
(74) *Attorney, Agent, or Firm* — KENEALY VAIDYA LLP

(57) ABSTRACT

A charging control device charges a battery device, and a control unit that is configured to control a switch and to control charging of the battery device. The control unit estimates a total voltage when each battery is not bypassed in each of the plurality of storage battery systems, selects the storage battery system having a low voltage among the estimated total voltages, and then repeatedly executes selective charging of charging the selected storage battery system so that an estimated total voltage difference between the storage battery system having the low voltage in the estimated total voltage and the storage battery system having a high voltage in the estimated total voltage is less than a predetermined value.

5 Claims, 3 Drawing Sheets

CHARGING CONTROL DEVICE, BATTERY SYSTEM, AND CHARGING CONTROL METHOD

CROSS-REFERENCE TO RELATED APPLICATIONS

This application is based on and claims priority under 35 USC 119 from Japanese Patent Application No. 2020-132571 filed on Aug. 4, 2020, the contents of which are incorporated herein by reference.

TECHNICAL FIELD

The present invention relates to a charging control device, a battery system, and a charging control method.

BACKGROUND ART

In the related art, a battery device is known in which a plurality of batteries are connected in series via a switch and a switch for connecting to a bypass line which bypasses each battery is also provided. The battery device can bypass a specific battery by controlling the switch for connecting to the bypass line (see, for example, JP-A-2013-031247).

A battery device is known in which a battery cell group is formed by connecting a plurality of battery cell rows in which a plurality of battery cells are connected in series in parallel. Since the battery device has a plurality of storage battery systems composed of the battery cell rows in parallel, a high-output operation is possible by a parallel operation (see, for example, JP-A-2013-240155).

Here, in the cascade use which collects used batteries used for in-vehicle use or the like and forms a storage battery for large vehicles, a stationary battery system, or the like which integrates the used batteries, a problem is that a deterioration state of each battery differs depending on how to use a battery in the past. Therefore, it is conceivable to configure each battery to be bypassable as described in JP-A-2013-031247. This makes it possible to bypass only a specific battery, and thus, for example, other batteries connected in series can be used, bypassing only the battery with low battery capacity. Further, as described in JP-A-2013-240155, by providing a plurality of storage battery systems in which a plurality of battery cells are connected in series in parallel, it is possible to perform a parallel operation and obtain a high output.

However, in a configuration adopting the techniques described in JP-A-2013-031247 and JP-A-2013-240155, when the battery is bypassed while charging is in progress, a total voltage of the bypassed storage battery system drops, which causes a difference from a total voltage of another storage battery system.

In addition, charging is performed for each storage battery system, which also causes a difference in the total voltage of the stored voltage, and thus when a parallel operation is performed when a charge mode is suddenly changed to a discharge mode, a circulating current flows between the systems.

That is, when a difference occurs in the total voltage, a circulating current determined by a potential difference between the systems and resistance components such as internal resistance of a battery cell, a cutoff switch, a bus bar, and wiring flows between the systems. For example, when a potential difference is 4 V and a resistance component is 100 mΩ, a circulating current of 40 A flows. In this case, when the system through which the circulating current flows includes cells or circuit components which cannot tolerate the circulating current, the systems cannot be connected in parallel therebetween.

SUMMARY OF INVENTION

The present invention is made to solve such a problem of the related art and an object of the present invention is to provide a charging control device, a battery system, and a charging control method which can reduce the possibility that high-output operation by parallel connection cannot be performed when a plurality of storage battery systems in which a plurality of batteries are connected in series are provided in parallel.

A charging control device according to the present invention charges a battery device including a battery group with a plurality of storage battery systems in parallel in each of which a plurality of batteries are connected in series, a system switch which switches between connection and disconnection of the storage battery system, and a bypass switch which bypasses each of the plurality of batteries constructing the plurality of storage battery systems. The charging control device includes a control unit that is configured to control the system switch and the bypass switch and to control charging of the battery device. The control unit is configured to estimate a total voltage when each battery is not bypassed in each of the plurality of storage battery systems, to select the storage battery system having a low voltage among the estimated total voltages, and then to repeatedly execute selective charging of charging the selected storage battery system so that an estimated total voltage difference between the storage battery system having the low voltage in the estimated total voltage and the storage battery system having a high voltage in the estimated total voltage is less than a predetermined value.

A battery system according to the present invention includes a battery device including a battery group with a plurality of storage battery systems in parallel in each of which a plurality of batteries are connected in series, a system switch which switches between connection and disconnection of the storage battery system, and a bypass switch which bypasses each of the plurality of batteries constructing the plurality of storage battery systems, and the above charging control device.

A charging control method according to the present invention charges a battery device. The battery device includes a battery group with a plurality of storage battery systems in parallel in each of which a plurality of batteries are connected in series, a system switch which switches between connection and disconnection of the storage battery system, and a bypass switch which bypasses each of the plurality of batteries forming the plurality of storage battery systems. The charging control method includes a controlling step of controlling the system switch and the bypass switch to control charging of the battery device.

In the controlling step, a total voltage is estimated when each battery is not bypassed in each of the plurality of storage battery systems, the storage battery system having a low voltage among the estimated total voltages is selected, and selective charging of charging the selected storage battery system is repeatedly executed so that an estimated total voltage difference between the storage battery system having the low voltage in the estimated total voltage and the storage battery system having a high voltage in the estimated total voltage is less than a predetermined value.

DESCRIPTION OF EMBODIMENT

Hereinafter, the present invention will be described with reference to a preferred embodiment. The present invention is not limited to the embodiment shown below and can be appropriately modified without departing from the spirit of the present invention. Further, in the embodiment shown below, some parts of the configurations are not illustrated or explained. However, it goes without saying that, as for the details of the omitted technology, publicly known or well-known technology is appropriately applied as long as there is no contradiction with the contents described below.

Figure 1:
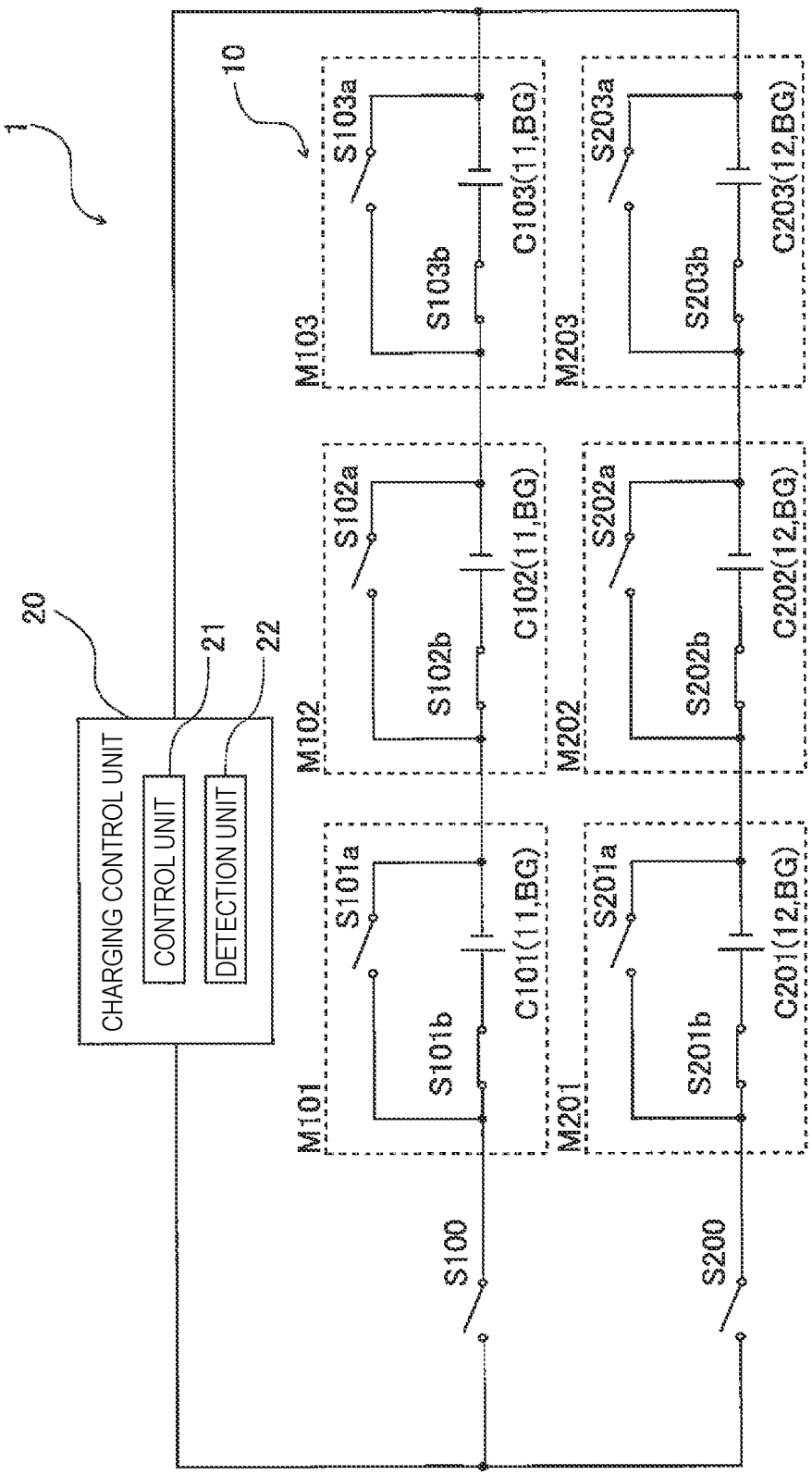
FIG. 1 is a configuration diagram illustrating a battery system according to a present embodiment.

FIG. 1 is a configuration diagram illustrating a battery system according to a present embodiment. A battery system 1 illustrated in FIG. 1 is for suppressing circulating current at the time of parallel connection within an allowable range and includes a battery device 10 and a charging control unit (charging control device) 20.

The battery device 10 includes a battery group BG, a plurality of system switches S100 and S200 (two of system switches in FIG. 1), a plurality of parallel switches (bypass switches) S101a to S103a and S201a to S203a, and a plurality of series switches (bypass switches) S101b to S103b and S201b to S203b.

The battery group BG includes a plurality of storage battery systems 11 and 12 (two of storage battery systems in FIG. 1) in parallel. In the first storage battery system 11, a plurality of batteries C101 to C103 (three batteries in FIG. 1) are connected in series via the plurality of series switches S101b to S103b. In the second storage battery system 12, a plurality of batteries C201 to C203 (three batteries in FIG. 1) are connected in series via the plurality of series switches S201b to S203b. Each of the batteries C101 to C103 and C201 to C203 is a used battery (which may be a unit cell or a battery composed of a plurality of cells) which are used and collected for in-vehicle use or the like. The batteries C101 to C103 and C201 to 0203 may be configured by, for example, batteries whose deterioration states are measured and which have the same degree of deterioration state, or may be configured by batteries having different deterioration states. The battery group BG is designed to satisfy a voltage and the like according to the target usage in consideration of the deterioration state of each of the batteries C101 to C103 and C201 to C203.

The plurality of system switches S100 and S200 are provided on paths from the charging control unit 20 to the respective storage battery systems 11 and 12. The plurality of system switches S100 and S200 switch the connection and disconnection between the respective storage battery systems 11 and 12 and the charging control unit 20.

The plurality of parallel switches S101a to S103a and S201a to S203a and the plurality of series switches S101b to S103b and S201b to S203b are switches for bypassing each of the plurality of batteries C101 to C103 and C201 to C203 forming the respective storage battery systems 11 and 12. When not bypassing each of the plurality of batteries C101 to C103 and C201 to C203, the plurality of series switches S101b to S103b and S201b to S203b are turned on (in a connected state) and the plurality of parallel switches S101a to S103a and S201a to S203a are turned off (in a cutoff state). On the other hand, when bypassing each of the plurality of batteries C101 to C103 and C201 to C203, the plurality of series switches S101b to S103b and S201b to S203b are turned off and the plurality of parallel switches S101a to S103a and S201a to S203a are turned on.

As illustrated in FIG. 1, in the battery system 1 according to the present embodiment, the batteries C101 to C103 and C201 to C203, the parallel switches S101a to S103a, and S201a to S203a, and the series switches S101b to S103b and S201b to S203b are combined one by one to form each of battery modules M101 to M103 and M201 to M203.

The charging control unit 20 has a control unit 21 which controls the switches S100, S200, S101a to S103a, S201a to S203a, S101b to S103b, and S201b to S203b. The charging control unit 20 is connected to a commercial power source via, for example, an A/D converter, or is connected to another DC power source, and the control unit 21 uses the power sources to control the charging of the battery device 10. The charging control unit 20 also includes a detection unit 22 which can detect the voltage or the like of each of the batteries C101 to C103 and C201 to C203, or acquire information from a detecting device.

Further, in the present embodiment, the control unit 21 performs selective charging in which any one of the plurality of storage battery systems 11 and 12 is selected and charged. In selecting the storage battery system 11 or 12 to be charged, first, the control unit 21 estimates the total voltage when each of the batteries C101 to C103 and C201 to C203 is not bypassed in each of the plurality of storage battery systems 11 and 12. That is, during charging, the fully charged batteries C101 to C103 and C201 to C203 are bypassed from the viewpoint of preventing overcharging and the total voltage changes by being bypassed. However, during discharging (particularly high-output operation by parallel operation), the fully charged batteries C101 to C103 and C201 to C203 are used without being bypassed. Therefore, even when there are the batteries C101 to C103 and C201 to C203 which are bypassed during charging, the control unit 21 estimates the total voltage for each of the plurality of storage battery systems 11 and 12, assuming that the bypassed batteries C101 to C103 and C201 to C203 are not bypassed.

Next, the control unit 21 selects the storage battery systems 11 or 12 whose estimated total voltage is on the low voltage side (more preferably the lowest). Since the battery system 1 according to the present embodiment has two storage battery systems 11 and 12, the storage battery system 11 or 12 having the lower estimated total voltage is selected from the two.

Then, the control unit 21 charges the selected storage battery system 11 or 12 so that an estimated total voltage difference from the storage battery system 11 or 12 on the higher (more preferably the highest) estimated total voltage side is less than a predetermined value. Since there are two storage battery systems 11 and 12 in the battery system 1 according to the present embodiment, the storage battery system 11 or 12 is selectively charged so that the total voltage difference from the storage battery system 11 or 12 having the higher estimated total voltage of the two is less than the predetermined value. The predetermined value is set to a value at which the circulating current is within the allowable range.

Then, the control unit 21 repeatedly executes the above-described selective charging until all the storage battery systems 11 and 12 are fully charged. Therefore, by reducing the difference in total voltage (when there is no bypass) between the storage battery systems 11 and 12, it is possible to increase the possibility that the circulating current is within an allowable range even when parallel operation is performed when a discharge mode is suddenly shifted.

In addition, in the above description, the storage battery system 11 or 12 on the high voltage side refers to the storage battery system 11 or 12 belonging to the higher one when the total voltages are divided into the higher one and the lower one for the plurality of storage battery systems 11 and 12. Similarly, the storage battery system 11 or 12 on the low voltage side also refers to the storage battery system 11 or 12 belonging to the lower side when divided into two.

Here, even when the total voltage difference becomes less than the predetermined value during the execution of selective charging, the control unit 21 continues to charge the selected storage battery system 11 or 12 until any of the plurality of batteries C101 to C103 and C201 to C203 is newly fully charged. As a result, for example, it is possible to charge the storage battery system 11 or 12 on the high voltage side so as to exceed the estimated total voltage, and thus all the storage battery systems 11 and 12 can be charged to full charge.

Figure 2:
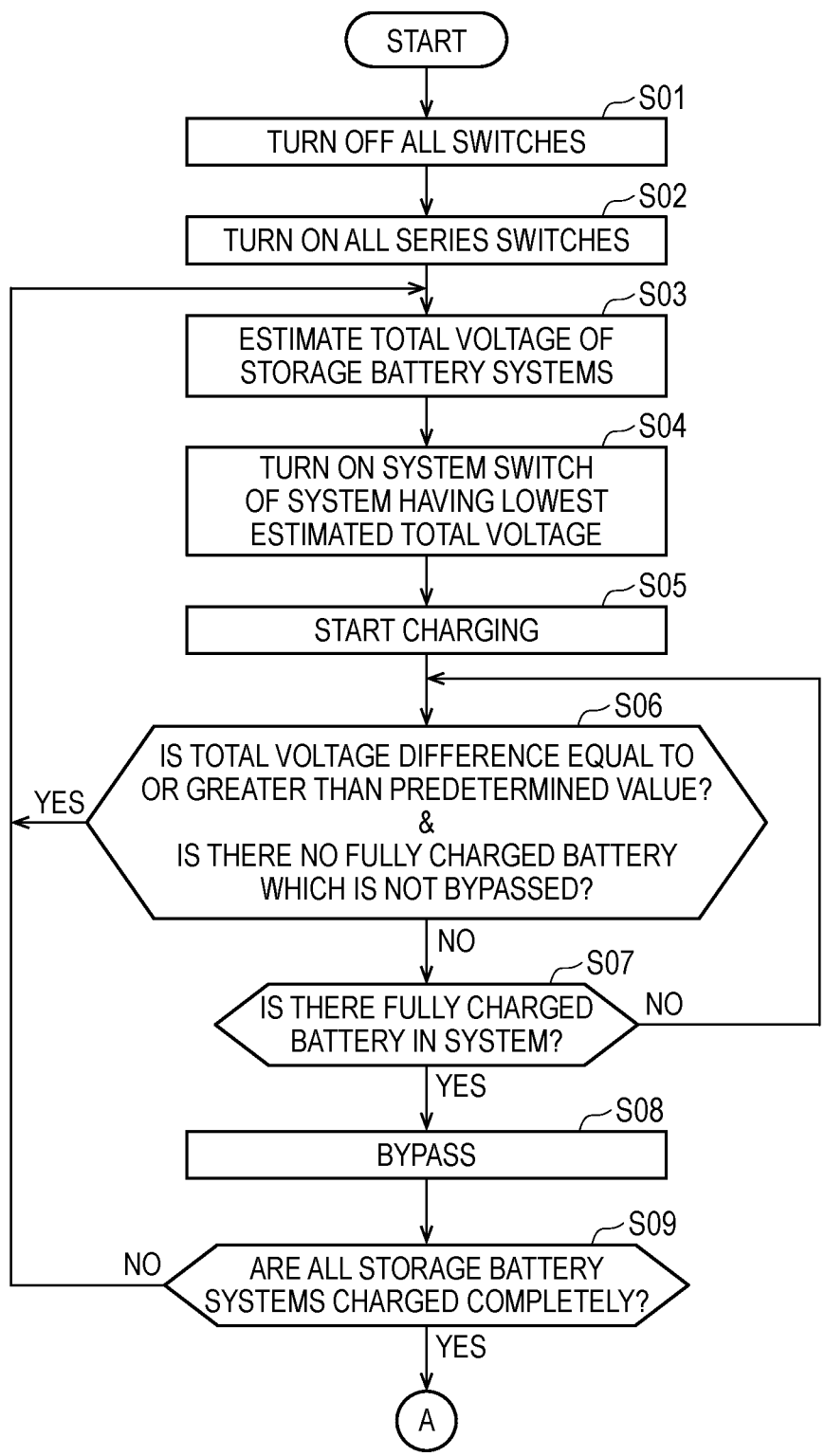
FIG. 2 is a flowchart illustrating a charging control method according to the present embodiment, and showing a first half portion.
Figure 3:
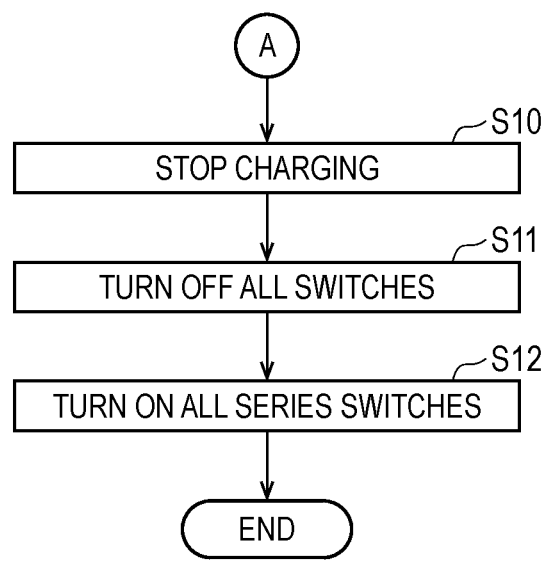
FIG. 3 is a flowchart illustrating the charging control method according to the present embodiment, and showing a second half portion.

Next, a charging control method according to the present embodiment will be described, FIGS. 2 and 3 are flowcharts illustrating the charging control method according to the present embodiment. First, as illustrated in FIG. 2, the control unit 21 turns off all the switches S100, S200, S101a to S103a, S201a to S203a, S101b to S103b, and 5201b to S203b (S01).

Next, the control unit 21 turns on all the series switches S101b to S103b and S201b to S203b (S02). Then, the control unit 21 of the charging control unit 20 estimates the total voltage of each of the storage battery systems 11 and 12 (S03). In this process, the control unit 21 estimates the total voltage of each of the batteries C101 to C103 and C201 to C203 when there is no bypass.

Next, the control unit 21 selects the storage battery system 11 or 12 having the lowest total voltage estimated in Step S03 and turns on the system switch S100 or S200 corresponding to the storage battery system 11 or 12 (S04).

Next, the control unit 21 starts charging the storage battery system 11 or 12 on the side where the system switch S100 or S200 is turned on in Step S04 (S05). Next, the control unit 21 determines whether the estimated total voltage difference from the storage battery system 11 or 12 having the highest total voltage estimated in Step S03 is equal to or greater than the predetermined value, and whether there are no fully charged batteries C101 to C103 or C201 to C203 in the non-bypassed batteries C101 to C103 and C201 to C203 (S06).

When both are satisfied in Step S06 (S06: YES), that is, when the estimated total voltage difference is large and there are no unbypassed fully charged batteries C101 to C103 and C201 to C203, the process proceeds to Step S03.

On the other hand, when either one is not satisfied in Step S06 (S06: NO), for example, when the estimated total voltage difference becomes small, or when there are unbypassed fully charged batteries C101 to C103 or C201 to C203, the control unit 21 determines whether fully charged batteries C101 to C103 or C201 to C203 exist in the storage battery systems 11 and 12 (S07) being charged.

When the fully charged batteries C101 to C103 or C201 to C203 do not exist in the storage battery systems 11 and 12 (S07: NO) being charged, the process proceeds to step S06. That is, when the estimated total voltage difference is less than the predetermined value, it becomes "NO" in Step S06. Therefore, unless there are newly fully charged batteries C101 to C103 or C201 to C203 in the storage battery systems 11 and 12 being charged, it becomes "NO" in Step S07 and the loop is performed in Steps S06 and S07.

On the other hand, when there are fully charged batteries C101 to C103 or C201 to C203 in the storage battery systems 11 and 12 (S07: YES) being charged, the control unit 21 controls the parallel switches S101a to S103a and S201a to S203a and the series switches S101b to S103b and S201b to S203b to bypass fully charged batteries C101 to C103 and C201 to C203 (S08).

Next, the control unit 21 determines whether all the storage battery systems 11 and 12 are charged completely (S09). When all the storage battery systems 11 and 12 are not charged completely (S09: NO), the process proceeds to Step S03.

On the other hand, when charging of all storage battery systems 11 and 12 is completed (S09: YES), as illustrated in FIG. 3, the control unit 21 stops charging (S10) and turns off all the switches S100, S200, S101a to S103a, S201a to S203a, S101b to S103b, and S201b to S203b (S11).

Then, the control unit 21 turns on all the series switches S101b to S103b and S201b to S203b (S12). Next, the processes illustrated in FIGS. 2 and 3 are completed. In this way, according to the charging control unit 20, the battery system 1, and the charging control method according to the present embodiment, the total voltage is estimated when each of the batteries C101 to C103 and C201 to C203 is not bypassed in each of the plurality of storage battery systems 11 and 12, and then selective charging of charging the storage battery system 11 or 12 on the low voltage side is repeatedly executed so that the estimated total voltage difference between the storage battery system 11 or 12 on the low estimated total voltage side and the storage battery system 11 or 12 on the high voltage side is less than the predetermined value. Therefore, charging is performed so as to reduce the total voltage difference between the storage battery system 11 or 12 having the low total voltage and the storage battery system 11 or 12 having the high total voltage, and thus the circulating current can be kept small even when the parallel operation is performed at the time of unexpected discharge. Therefore, it is possible to reduce the possibility that high-output operation by parallel connection cannot be performed.

Also, even when the total voltage difference becomes less than the predetermined value during the execution of selective charging, the storage battery systems 11 and 12 are continuously charged until any of the plurality of batteries C101 to C103 and C201 to C203 is newly fully charged. Therefore, by not completing charging immediately when the total voltage difference becomes less than the predetermined value, for example, it is possible to perform a charging that exceeds the total voltage of the storage battery system 11 or 12 on the high voltage side. As a result, all the storage battery systems 11 and 12 can be charged to full charge.

The present invention is described above based on the embodiment. However, the present invention is not limited to the embodiment described above and changes may be made or well-known and known techniques may be combined without departing from the spirit of the present invention.

For example, in the embodiment described above, two storage battery systems 11 and 12 are provided, but may be three or more. Further, the batteries C101 to C103 and C201 to C203 forming the storage battery systems 11 and 12 are three, but may be two or four or more. Further, the batteries C101 to C103 and C201 to C203 may be unit cells, or may be modules composed of a plurality of unit cells.

According to the present invention, when a plurality of storage batter systems in which a plurality of batteries are connected in series are provided in parallel, it is possible to reduce the possibility that high-output operation by parallel connection cannot be performed.

What is claimed is:

1. A charging control device which charges a battery device, the battery device including:
   a battery group with a plurality of storage battery systems in parallel in each of which a plurality of batteries are connected in series,
   a plurality of system switches which switch between connection and disconnection of the storage battery system, a respective one of the system switches is connected in series with a respective one of the storage battery systems, and
   a plurality of bypass switches which bypass each of the plurality of batteries constructing the plurality of storage battery systems,
   the charging control device comprising:
      a control unit that is configured to control each of the system switches and the bypass switches and to control charging of the battery device,
   wherein the control unit is configured to estimate a total voltage for each of the storage battery systems when all batteries of each of the storage battery systems are not bypassed,
      turn on a corresponding one of the system switches to select one of the storage battery systems having a low voltage among the estimated total voltages,
      turn off a different one of the system switches to disconnect a different one of the storage battery systems having a high voltage among the estimated voltages, and
      then repeatedly execute selective charging of the one of the storage battery systems so that an estimated total voltage difference between the one of the storage battery systems and the different one of the storage battery systems is less than a predetermined value.

2. The charging control device according to claim 1, wherein
   even when the total voltage difference becomes less than the predetermined value during execution of the selective charging, the control unit continues to charge the selected storage battery system until any of the plurality of batteries is newly fully charged.

3. A battery system comprising:
   a battery device including a battery group with a plurality of storage battery systems in parallel in each of which a plurality of batteries are connected in series, a plurality of system switches which switch between connection and disconnection of the storage battery system, and a plurality of bypass switches which bypass each of the plurality of batteries constructing the plurality of storage battery systems; and
   the charging control device according to claim 1.

4. A charging control method of a charging control device which charges a battery device,
   the battery device including:
      a battery group with a plurality of storage battery systems in parallel in each of which a plurality of batteries are connected in series,
      a plurality of system switches which switch between connection and disconnection of the storage battery system, a respective one of the system switches is connected in series with a respective one of the storage battery systems, and
      a plurality of bypass switches which bypass each of the plurality of batteries forming the plurality of storage battery systems, the charging control method comprising:
         a controlling step of controlling each of the system switches and the bypass switches to control charging of the battery device,
      wherein in the controlling step, a total voltage is estimated for each of the storage battery systems when all batteries of each of the plurality of storage battery systems are not bypassed, one of the storage battery systems having a low voltage among the estimated total voltages is selected by turning on one of the system switches connected to the one of the storage battery systems and turning off a different one of the system switches that is connected to a different one of the storage battery systems having a high voltage among the estimated total voltages, and selective charging of the one of the storage battery systems is repeatedly executed so that an estimated total voltage difference between the one of the storage battery systems and the different one of the storage battery systems is less than a predetermined value.

5. A charging control device which charges a battery device, the battery device including:
   a battery group with a plurality of storage battery systems in parallel in each of which a plurality of batteries are connected in series,
   a plurality of system switches which switch between connection and disconnection of the storage battery system, a respective one of the system switches is connected in series with a respective one of the storage battery systems, and
   a plurality of bypass switches which bypass each of the plurality of batteries constructing the plurality of storage battery systems,
   the charging control device comprising:
      a control unit that is configured to control each of the system switches and the bypass switches and to control charging of the battery device,
   wherein the control unit is configured to estimate a total voltage for each of the storage battery systems when all batteries of each of the storage battery systems are not bypassed regardless of whether or not each battery is bypassed,
      turn on a corresponding one of the system switches to select one of the storage battery systems having a low voltage among the estimated total voltages,
      turn off a different one of the system switches to disconnect a different one of the storage battery systems having a high voltage among the estimated voltages, and
      then repeatedly execute selective charging of the one of the storage battery systems so that an estimated total voltage difference between the one of the storage battery systems and the different one of the storage battery systems is less than a predetermined value, and
   when discharging, each of the fully charged batteries is used without being bypassed, executing parallel operation in which a plurality of the storage battery systems are connected in parallel.

* * * * *